March 15, 1955

F. H. OWENS 2,704,008

PREFOCUSED SLIDE AND CARD HOLDER FOR TELEVISION PROJECTORS

Filed April 6, 1951

4 Sheets-Sheet 1

INVENTOR.
FREEMAN H. OWENS
BY
Philip S. McLean
ATTORNEY

March 15, 1955

F. H. OWENS 2,704,008

PREFOCUSED SLIDE AND CARD HOLDER
FOR TELEVISION PROJECTORS

Filed April 6, 1951

4 Sheets-Sheet 2

INVENTOR.
FREEMAN H. OWENS
BY
Philip S. McLean
ATTORNEY

INVENTOR.
FREEMAN H. OWENS
BY
Philip S. McLean
ATTORNEY

March 15, 1955

F. H. OWENS

PREFOCUSED SLIDE AND CARD HOLDER FOR TELEVISION PROJECTORS 2,704,008

Filed April 6, 1951

4 Sheets-Sheet 4

INVENTOR.
FREEMAN H. OWENS

BY

ATTORNEY

United States Patent Office 2,704,008

Patented Mar. 15, 1955

2,704,008

PREFOCUSED SLIDE AND CARD HOLDER FOR TELEVISION PROJECTORS

Freeman H. Owens, New York, N. Y.

Application April 6, 1951, Serial No. 219,680

10 Claims. (Cl. 88—26)

The invention here disclosed relates to the holders used in the machine disclosed in copending patent application Serial No. 236,114, filed July 11, 1951, for supporting the slides and cards used in projecting a television program.

These slides and cards vary in thickness and other characteristics, requiring careful focusing to effect good, clear projection.

Important objects of the present invention are to provide a holder which, after the slide, card or other object has been mounted in place thereon, can be quickly and easily focused for that particular object, so that when the holder is placed in the machine for projecting the image to the television projector, there will be no need for focusing and the picture produced will be in proper focus.

This prefocusing possibility enables the machine to be set up with all the changes required for a complete program.

Accordingly, other important objects of the invention are to provide what may be called for convenience, slide holders, which may be arranged in the necessary sequence for a program and be handled as a group to be placed in and removed from the slide projecting machine as such.

Special objects of the invention are to provide slide holders having maximum adjustment possibilities as to substitution of slides and cards of different sizes and the shifting and movement of these for "framing" and for movement in projection and other purposes.

,Additional objects of the invention are to so construct the holders that they will automatically, as they come into the projecting position, set necessary components of the machine in proper relative position or adjustment for effecting the projection of the particular subject matter on such a holder.

Other desirable objects attained by the invention are set forth and will appear in the course of the following specification, wherein further details of the invention are described and broadly claimed.

The drawings accompanying and forming part of the specification illustrate certain present practical embodiments of the invention, but it will be realized that further modifications and changes may be made, all within the true intent and broad scope of the invention as hereinafter defined and claimed.

Fig. 1 in the drawings is a plan view of one of the projecting machines disclosed in the copending application identified, with a set of the holders in position thereon;

Figures 3, 4, 5:
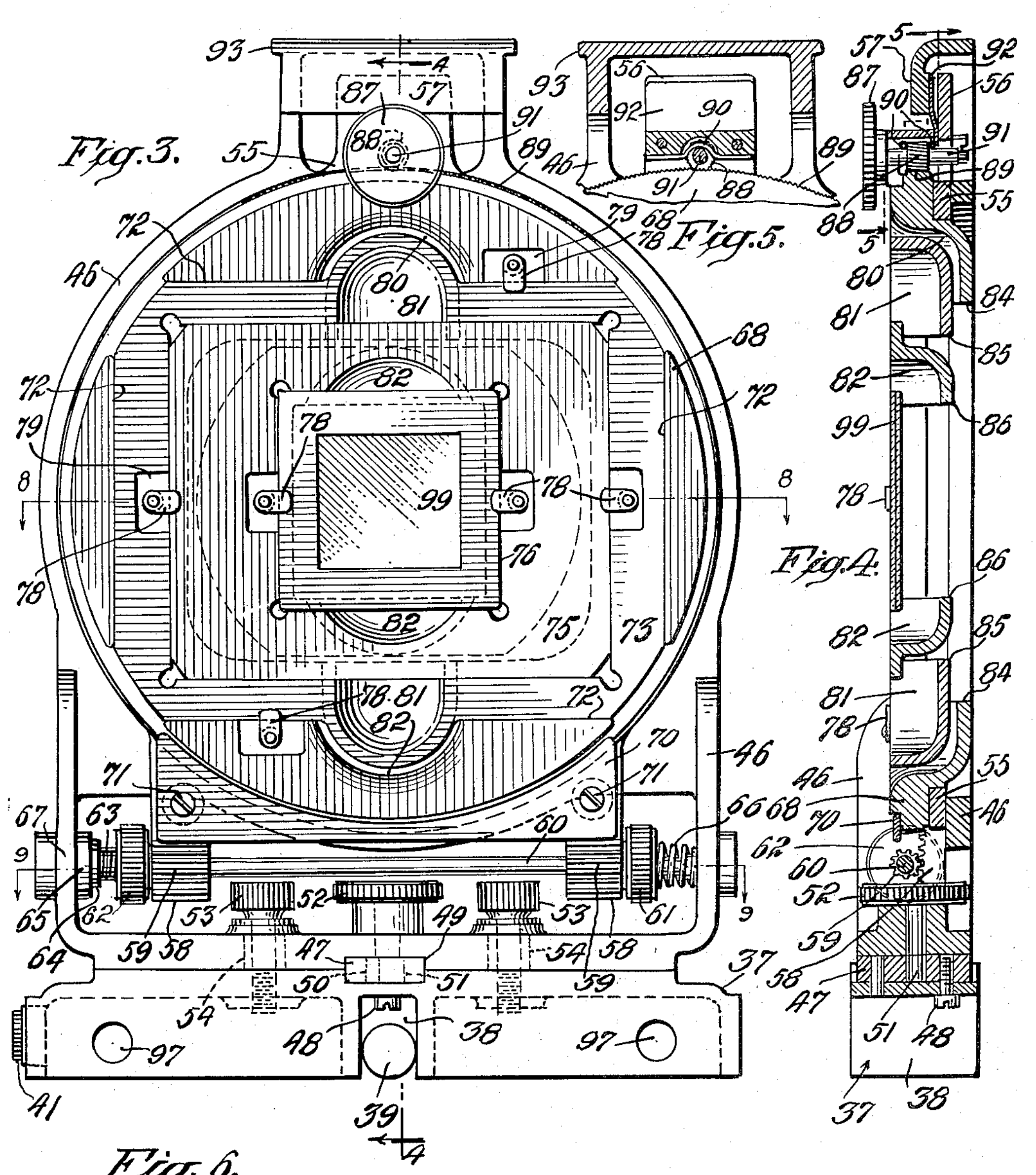
Fig. 3 is an enlarged front elevation of one of the holders, showing the three different size adapters all in place thereon.
Fig. 4 is a vertical sectional view of the same on substantially the plane of line 4—4 of Fig. 3.
Fig. 5 is a broken sectional detail on substantially the line 5—5 of Fig. 4.
Figures 10, 11, 12, 13, 14, 15, 16, 17:
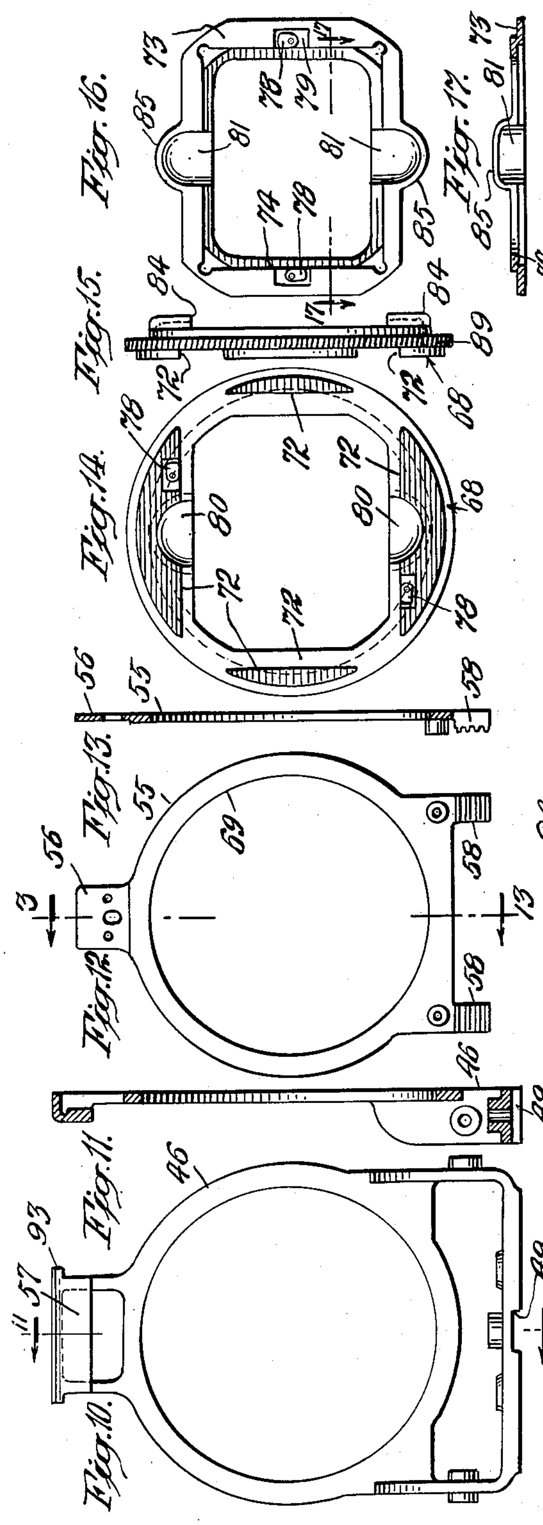
Figures 8, 9, 18, 19:
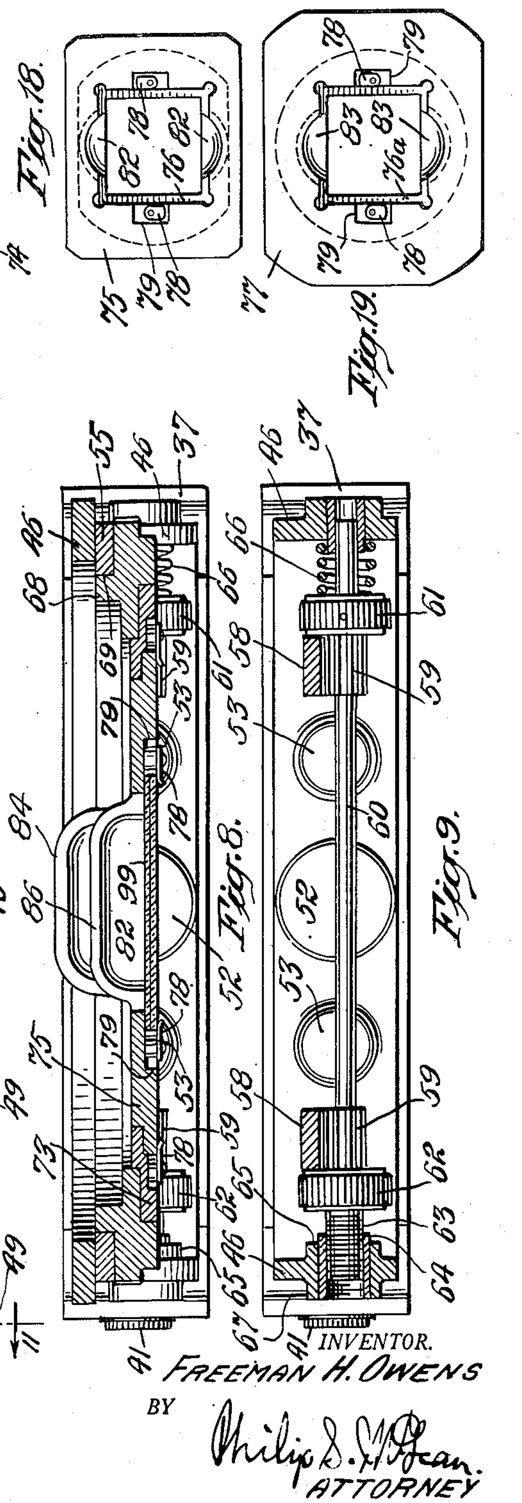
Figure 20:
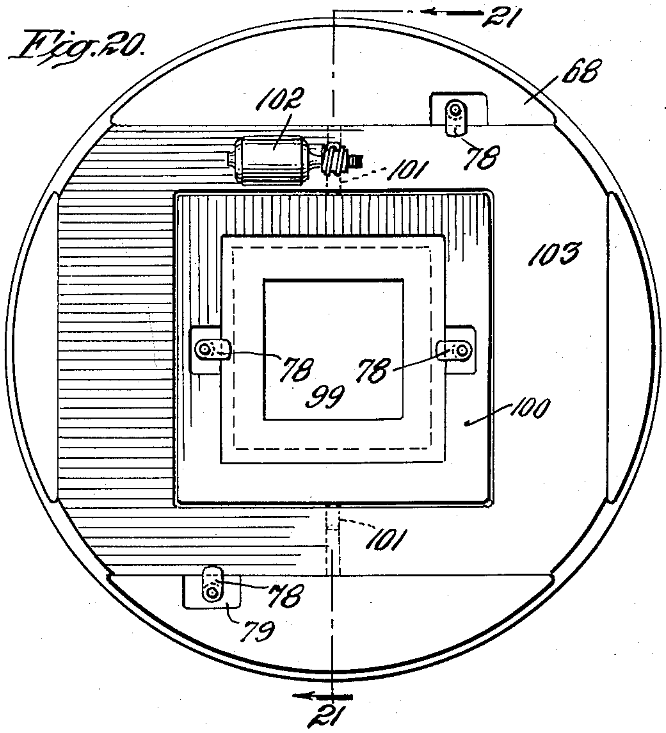
Figure 21:
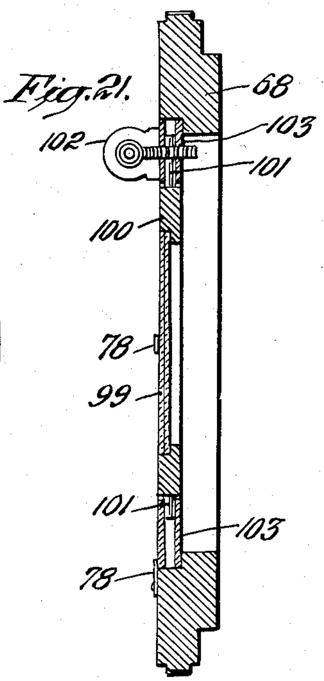
Figure 22:
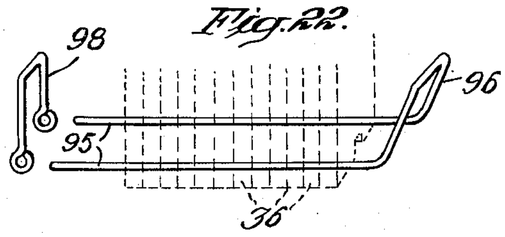
Figure 23:
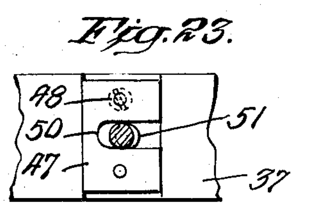
Figure 24:
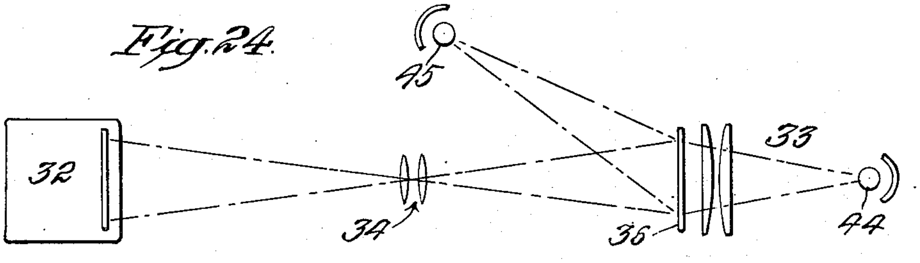

Figs. 8 and 9 are horizontal cross sectional views of the holder on substantially the planes of lines 8—8 and 9—9, respectively, of Fig. 3;

Fig. 10 is a front elevation of the upstanding frame portion of the holder, removed from the base;

Fig. 11 is a vertical sectional view of the same on substantially the plane of line 11—11 of Fig. 10;

Fig. 12 is a front elevation of the vertically operating slide portion of the holder;

Fig. 13 is a sectional view of the same on substantially the plane of line 13—13 of Fig. 12;

Fig. 14 is a front elevation of the rotatable ring carrier part of the holder, and Fig. 15 is an edge view of the same;

Fig. 16 is a face view of the largest size card holder, usually the 4" x 5" slide or card carrier;

Fig. 17 is a sectional view of the same on substantially the plane of line 17—17 of Fig. 16;

Figs. 18 and 19 are face views of the 3¼" x 4" and 2" x 2" frames or carriers;

Fig. 20 is a front view of a pivotal card holding adapter;

Fig. 21 is a vertical sectional view of same on substantially the line 21—21 of Fig. 20;

Fig. 22 is a plan view illustrating the rack for carrying the holders in proper sequential arrangement for mounting on the projecting machine;

Fig. 23 is a horizontal sectional view illustrating the focusing eccentric;

Fig. 24 is a diagram illustrating optical features and showing the relation of the card holder in the projecting machine to the mosaic of the television camera.

Figure 1:
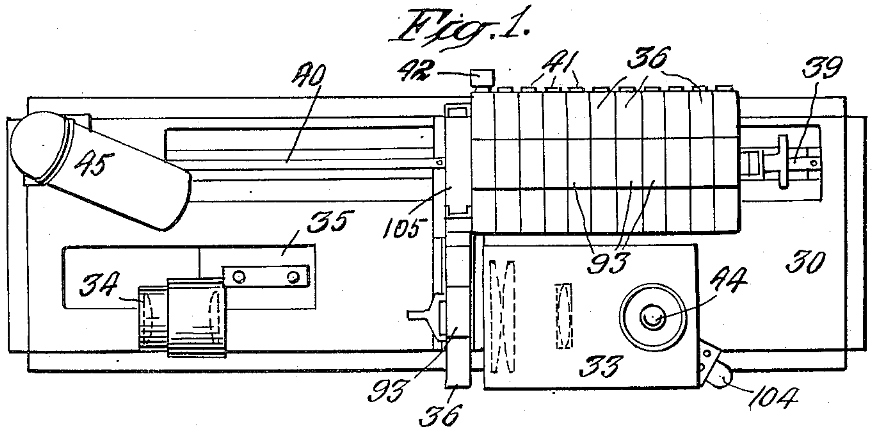
Figure 2:
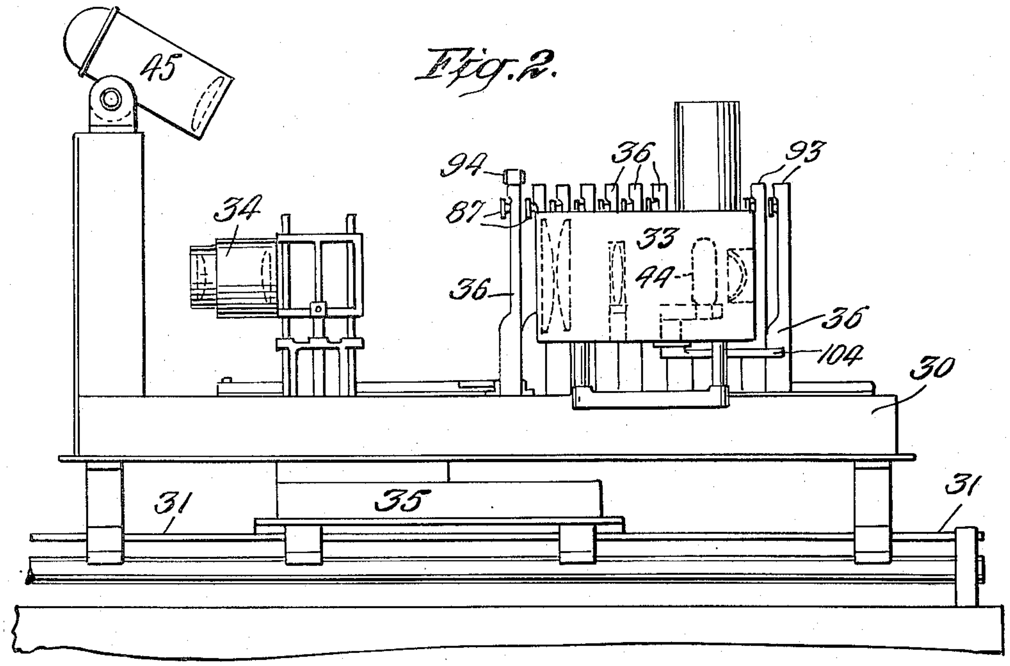
Fig. 2 is a broken side elevation of the same.

The general views, Figs. 1 and 2, illustrate certain features of the card or slide projecting machine disclosed in patent application Serial No. 255,806, filed November 10, 1951, and comprising a carriage 30 slidably adjustable on rods 31 toward and away from the mosaic of the television camera 32 (Fig. 24) and carrying the slide projector 33 cooperative with the projecting lens 34 on the carriage 35, separately adjustable on the guide rods 31.

The holders carrying the cards and slides are designated 36.

As shown particularly in Fig. 1, a whole group of these holders may be arranged sequentially in the order in which they are to be displayed and be so located on the carriage 30 at the side of the projector 33, ready to be shifted, one at a time, by the mechanism of the machine into the projecting position directly in line with the lens system of the projector.

The mechanism for shifting the holder at the front of the group or "stack" of holders laterally into position in front of the projector 33 and then returning it back to the column and advancing it forwardly while the stack is advanced to bring the No. 2 holder into position for lateral shifting, is not here shown for the reason that all such mechanism is disclosed in the companion patent application above identified.

To maintain the holders in alignment and to enable the lateral cross shifting to be accomplished, the holders are shown as having base portions 37 with notches 38 in the undersides of the same to engage over a guide rod 39 on the entry end, and over an aligned rod 40 on the exit end of the machine, and affording a grip for a shifter which operates laterally in the space between adjoining ends of the guide rods.

This shifter is partly shown at 105 and it will be understood from Fig. 1 that it operates to shift the holder from position at the front of the stack over into position in front of the projector 33 and then after projection, to return it back into position in line with the stack and whereupon the stack will be bodily advanced to bring the next holder into registration with the shifter.

In advancing into position for projection, each holder automatically sets the machine for proper projection of the subject matter.

Figure 6:
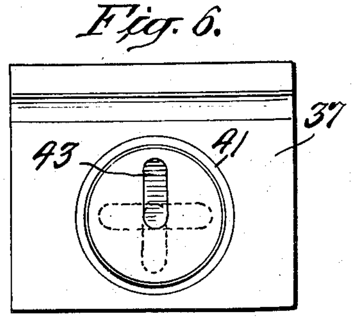
Fig. 6 is an end view of the base portion of the holder showing the turn-button for coaction with the stationary controller.

This is accomplished by mounting a turn-button 41, Figs. 3 and 6, on the end of the base of each holder, which in the position just prior to engagement by the lateral shifter, as shown in Fig. 1, will engage with a stationary controller 42 to set certain relays or other mechanism timed to come into action when that holder is in the display position in front of the projector 33.

Figure 7:
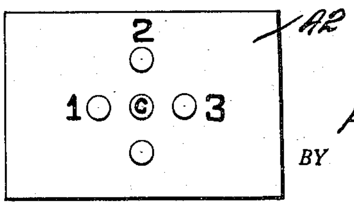
Fig. 7 is a face view of the coacting, relatively stationary controller.

It is sufficient for the present disclosure to understand that this controller, as shown in the face view, Fig. 7, has a set of three or more contacts designated 1, 2, 3, about a center contact C in position to be engaged by a radially extending contact bar 43 on the turn-button 41. The latter may be yieldingly located and retained in any one of the selected positions indicated, as by means of a spring ball detent or the like.

In Fig. 7 it may be considered that the No. 1 contact represents the circuit or circuits required for adjusting the machine for 2" x 2" cards or slides, that the No. 2 contact is for 3¼" x 4" cards or slides, and that the No. 3 contact is for the 4" x 5" cards or slides.

In mounting these different projection elements in the holders, the buttons or members 41 on the bases of the holders will be set for the particular item carried by the holder and then as each holder comes up into preliminary position, the machine will be set to effect the adjustments for that particular item when the holder carrying the same is shifted over into the projecting position.

The slides and transparencies are illuminated from behind by the lamp 44 of the projector 33, while cards or other items which are opaque are illuminated from a spotlamp 45 mounted on the main carriage 30 in front of and focused on the frame in position in front of the projector, as indicated particularly in Figs. 1, 2 and 24.

The distances between the mosaic of the projection camera 32, projection lens 34 and the holder 36, will vary according to the size and character of the subject projected, and it will be appreciated that the mechanism of the projection machine is capable of effecting necessary adjustments of the lens carriage 35 and the main carriage 30, required to accomplish these results.

The different size cards, slides and transparencies are supported in frames interchangeably engageable in a focusing frame 46 mounted in upstanding but fore and aft adjustable relation on the base 37.

For this fore and aft focusing adjustment the frame 46 is slidingly keyed on the base 37 by a parallel sided guide piece 47 fixed on the base by screw 48, the frame being grooved at 49, Fig. 10, to slidingly fit over the guide piece, and the latter having a transverse groove or slot 50 therein receiving the eccentric 51, Fig. 23, of the adjusting knob 52.

Before making these focusing adjustments the clamp screws 53 at opposite sides of the adjusting knob may be released, these screws extending loosely down through transverse slots 54 in the bottom of the frame 46, into the base 37, Fig. 3.

The prefocusing adjustments described may be made on the projecting machine, when the latter is not in active use, or be made on a special focusing box or machine having characteristics similar to the actual projecting machine.

Vertical and horizontal framing adjustments are accomplished through the medium of a movable upright frame 55, slidingly guided over the face of the relatively stationary upright frame, at the top by a projecting lug 56 engaged in back of a dependent flange 57 on the stationary frame, and at the bottom by dependent racks 58 engaged with pinions 59 on the cross shaft 60 journaled in opposite sides of the stationary upright frame.

The shaft 60 for effecting vertical adjustments is shown provided with a knob 61 for rotating the same.

Lateral adjustments of shaft 60 and the sliding frame 46 are effected, in the illustration, by a second knob 62 rotatably mounted on shaft 60 and having a screw engagement at 63, Fig. 9, with a bushing 64 rotatably mounted in a bearing 65 provided in the side of the upright frame 46.

A spring 66 about shaft 60 and interposed between the vertical adjusting knob 61 and adjoining side of the frame 46, thrusts the shaft and the dependent rack extensions engaged between the knobs laterally, to the left in Fig. 9, so that as knob 62 is unscrewed out of bushing 64 the latter will operate as a thrust element in rotary engagement with the side portion 67, Fig. 9, of the frame 46.

Rotary adjustments of the projected subject matter are effected, in the illustration, by a ring member 68, Figs. 14 and 15, rotatably seated in the circular bearing portion 69 of the sliding frame, held therein by an overstanding arcuate plate 70, Fig. 3, secured to the sliding frame by screws 71.

The angularly or rotatably adjustable carrier frame 68 is shown as having a rectangular seat 72 for the 4" x 5" cards or slides or for the adapter or adapters carrying smaller size cards or slides.

Figs. 16 and 17 show an adapter frame 73 which can be engaged in the seat 72 of the rotary frame and which is formed with a seat 74 to hold the 3¼" x 4" slides or cards or the adapter to carry a 2" x 2" card or slide.

An adapter frame 75 for the latter purpose is shown in Fig. 18, having a seat 76 for a 2" x 2" card or slide.

Instead of using two adapters in the rotary frame 68 to carry small size 2" x 2" cards or slides, an adapter such as shown at 77 in Fig. 19 may be provided, of a size to fit directly into the seat 72 in the rotary frame 68, Fig. 14, having a seat **76*a*** of a size to hold the small, such as 2" x 2", card or slide.

In each instance the carrier or adapter frame is equipped with some means for holding the card, slide, transparency or adapter frame therein, such as the small swinging links 78 pivotally supported in recesses 79 in these members adapted to be swung out into confining relation over the elements, whether they be cards, slides or adapter frames, located in the seats provided in these members.

These swinging links or buttons 78 have been found satisfactory for removably holding the cards, slides and frames in position, but other forms of holding devices may be substituted. These swinging buttons may be of spring material so that they will yieldingly hold in the positions to which they have been shifted. These spring retainers also automatically compensate for variations in thickness of the slides, cards or adapter frames, holding them firmly and accurately seated regardless of differences in thickness.

To further facilitate easy removal and substitution of cards, slides and frames, the ring member 68 and the sequentially inserted supporting frames such as 73, 75 and 77, are shown as formed with oppositely disposed, countersunk thumb and finger recesses 80, 81, 82, 83, having covering or enclosure walls at the back such as shown at 84, 85, 86, Fig. 4, which will prevent leakage of light about the supported material.

The finger openings described and the quickly releasable swinging links or latches 78 provide for the quick substitution and change of subjects in the holders.

The angular or rotary adjustment of the ring carrier 68 may be effected in different ways.

In the illustration a knob 87 is shown near the top of the holder carrying a pinion 88, Figs. 4 and 5, in mesh with the gear toothed rim 89 of the ring. This pinion is yieldingly held in engagement with the gear teeth of the ring, in the illustration, by means of an overstanding, arched spring 90, Fig. 5, bearing on the shaft 91 on which the pinion and turning knob are affixed, Fig. 4.

A slightly bowed spring is shown at 92, Fig. 4, interposed between the stationary frame 46 and sliding frame 69, to take up any slack and to yieldingly hold the sliding frame in various positions of adjustment.

Each holder is shown provided at the top with a handle portion 93, enabling holders to be readily lifted up out of a stack and shifted into different sequential positions as might be required for a change in program.

In using the holders, the cards, transparencies, slides or the like, are inserted and secured in the frames designed to receive the same and each prefocused by adjusting the knob 52 as heretofore described. The turning of this knob effects a fore and aft adjustment of the upstanding frame 46 on the base 37 to bring the subject into as sharp focal relation as may be desired. This prefocusing may be effected on the projecting machine in front of the projector 33, or in a special focusing machine having optical characteristics similar to the projecting machine. Up and down or lateral adjustments for framing or other purposes may be effected by the turn-buttons 61 and 62 on the horizontal shaft 60. Rotary or angular adjustments may be effected by the turn-button 87.

If complete 360° rotary adjustments are desired, or if it is wished to have the subject rotate on the screen during projection, the holder may carry a small electric motor indicatd at 94, Fig. 2, geared to rotate the ring carrier 68 and controlled by a manual or automatic switch.

As each holder is set up with the contained subject matter to be projected, the turn-button 41 at the end of the holder is adjusted as need be, to cooperate with the control switch 42 so that each holder as it comes up to the perparatory station, ready for shifting in front of the projector, will set the projection machine, ready to project that subject matter.

The holders for a particular sequence, all arranged in order, may be picked up as a unit and placed on the projection machine by means of a special rack shown in Fig. 22 as consisting of a pair of parallel spaced rods 95 connected at one end by a lifting handle 96 and adapted to be passed through the openings 97 in the bases of the holders, a second handle 98 usually being provided which can be removably engaged over the projecting ends of the rods.

With this lifting rack an entire group of the holders can be lifted, in aligned relation, and lowered into position on the main carriage 30 of the projecting machine, keyed thereon by engagement of the notches 38 in the bases over the aligning rod 39.

The used holders, which have gone through the projecting stage and have been shifted into aligned position over the key rod 40, may be removed from the projecting machine as a unit by inserting the rods of the lifting rack through the openings 97 and then lifting them as a group by handles 96 and 98.

In either the initial supply position over rod 39 or in the used position over the rod 40, any of the holders may be lifted out of position and, if desired, shifted over into a different position, as for example, to be passed through the projecting machine again. Similarly, a holder with new or different subject matter may be inserted at any time in any selected position in the stack of holders. All this allows for program changes to be made while the projection machine is in active relation or being set up for action.

It is contemplated that in many instances a pair of projection machines will be used in side-by-side relation, both focused on the same television camera, for alternate use, one ordinarily being prepared for action while the other is in actual service.

Figs. 3, 4 and 8 show a small size, such as a 2'' x 2'', transparency 99 removably held by clips 78 in its seat 76 in the smaller size adapter frame 75.

When displaying the smaller size cards or other subjects, the intermediate size carrier 73 may be omitted and the special carrier 77 illustrated in Fig. 19 be employed, this being of a size to seat in the ring 68 and being designed itself to carry the smaller size cards.

The ring 68 provides for rotation of the projected subject matter in a plane transverse to the optical axis.

To enable rotation of the subject matter on an axis transverse to the optical axis, the construction illustrated in Figs. 20 and 21 is provided, this being a card carrier 100 having a pivotal mounting 101 on an axis transversely intersecting the axis of projection.

A small motor is indicated at 102 geared to rotate the carrier 100 on the axis 101.

This display may be used to provide in projection the effect of turning the page of a book or the like.

The support for the pivoted card carrying frame may be a frame 103 adapted to be held by the clips 78 in the seat 72 of the ring carrier 68.

This arrangement has the advantage that the mounting for the pivoted card carrier is itself rotatable, in a plane transverse to the optical axis, so that combined effects may be obtained by rotation of the ring 68 and pivoted or swinging movement of the card carrier 100 carried by the ring.

Figs. 1 and 2 show how the projector 33 may be equipped with a control handle or lever 104 having means for shifting a spare lamp, when required, into active position, with necessary switching equipment for cutting out a defective lamp and connecting a fresh lamp in service condition.

The light shielded, finger receiving pockets such as indicated at 80, 81, etc., are of particular importance in enabling the cards, slides or other elements to be quickly removed and inserted without leaving thumb or fi;nger prints which would show up in the magnified projection of the subject matter.

At the projection station the holders may be automatically clamped in accurately positioned relation by holding mechanism operating as part of the projecting machine.

What I claim is:

1. A prefocusing holder for cards, glass slides, transparencies and like subjects to be shown in a projection machine for a television camera, comprising a mobile base for supporting the holder on the projection machine, said base having a flat bottom surface on which it may stand and be slid into projecting position on the projection machine and there being a notch in said bottom surface extending through from front to back of the base to engage over a fixed guide on the projection machine in line with other similarly guided holders, an upstanding frame keyed on the base for longitudinal movement on the base in respect to the optical axis for the subject matter being projected, means on said upright frame for removably supporting a card or other subject matter to be projected, means on said holder for shifting the frame longitudinally on the base and thereby effecting fine focusing adjusting movements of said upright frame on the base to suit the particular subject matter supported on said upright frame and means for securing said frame on the base in positions of focused adjustment for such subject matter and whereby said holder when placed in the projecting machine in a position determined by engagement of the notch in the base over the guide on the projection machine will be prefocused, ready for projection.

2. A prefocusing holder for cards, glass slides, transparencies and like subjects to be shown in a projection machine for a television camera, comprising a base for supporting the holder on the projection machine, an upstanding frame keyed on the base for longitudinal movement in respect to the optical axis for the subject matter being projected, means on said upright frame for removably supporting a card or other subject matter to be projected, means on said holder for effecting fine focusing adjusting movements of said upright frame on the base and means for securing said frame in positions of focused adjustment and whereby said holder when placed in the projecting machine will be prefocused, ready for projection, said means for effecting the focusing adjustments including a parallel sided key on the base, the frame having a groove in the bottom of the same slidingly engaging over said key, said key having an opening therein and a rotatable member on the frame having an eccentric element engaging in said opening.

3. A prefocusing holder for cards, glass slides, transparencies and like subjects to be shown in a projection machine for a television camera, comprising a base for supporting the holder on the projection machine, an upstanding frame keyed on the base for longitudinal movement in respect to the optical axis for the subject matter being projected, means on said upright frame for removably supporting a card or other subject matter to be projected, means on said holder for effecting fine focusing adjusting movements of said upright frame on the base and means for securing said frame in positions of focused adjustment and whereby said holder when placed in the projecting machine will be prefocused, ready for projection, said means for effecting the focusing adjustments including a parallel sided key on the base, the frame having a groove in the bottom of the same slidingly engaging over said key, said key having an opening therein and a rotatable member on the frame having an eccentric element engaging in said opening and the means for retaining the frame in focused position including clamp screws extending down through the bottom of the frame into the base at opposite sides of said key.

4. A prefocusing holder for cards, glass slides, transparencies and like subjects to be shown in a projection machine for a television camera, comprising a mobile base for supporting the holder on the projection machine, said base having a flat bottom surface on which it may stand and be slid into projecting position on the projection machine and there being a notch in said bottom surface extending through from front to back of the base to engage over a fixed guide on the projection machine in line with other similarly guided holders, an upstanding frame keyed on the base for longitudinal movement on the base in respect to the optical axis for the subject matter being projected, means on said upstanding frame for removably supporting a card or other subject matter to be projected, means on said holder for shifting the frame longitudinally on the base and thereby effecting fine focusing adjusting movements of said upstanding frame on the base to suit the particular subject matter supported on said upright frame, means for securing said frame on the base in positions of focused adjustment for such subject matter and whereby said holder when placed in the projecting machine in a position determined by engagement of the notch in the base over the guide on the projection machine will be prefocused, ready for projection, a member for identifying the particular subject matter carried by the holder, said identifying member being shiftably mounted on the side of the base in a position exposed for observation when the holders are lined up on the projection machine and said member being adjustable to different positions indicative of the subject matter carried by the holder.

5. A prefocusing holder for cards, glass slides, transparencies and like subjects to be shown in a projection machine for a television camera, comprising a mobile base for supporting the holder on the projection machine, said base having a flat bottom surface on which it may stand and be slid into projecting position on the projection machine and there being a notch in said bottom surface extending through from front to back of the base to engage over a fixed guide on the projection machine in line with other similarly guided holders, an upstanding frame keyed on the base for longitudinal movement on the base in respect to the optical axis for the subject matter being projected, means on said upstanding frame for removably supporting a card or other subject matter to be projected, means on said holder for shifting the frame longitudinally on the base and thereby effecting fine focusing adjusting movements of said upstanding frame on the base to suit the particular subject matter supported on said upright frame, means for securing said frame on the base in positions of focused adjustment for such subject matter and whereby said holder when placed in the projecting machine in a position determined by engagement of the notch in the base over the guide on the projection machine will be prefocused, ready for projection, a member for identifying the particular subject matter carried by the holder, said identifying member being shiftably mounted on the side of the base in a position exposed for observation when the holders are lined up on the projection machine and said member being adjustable to different positions indicative of the subject matter carried by the holder, and a controller engageable by said member in guided movement of the holder over the guide on the projection machine and actuated according to the position of said member to effect controls for display of the prefocused subject matter carried by the holder.

6. A prefocusing holder for cards, glass slides, transparencies and like subjects to be shown in a projection machine for a television camera, comprising a base for supporting the holder on the projection machine, an upstanding frame keyed on the base for longitudinal movement in respect to the optical axis for the subject matter being projected, means on said upright frame for removably supporting a card or other subject matter to be projected, means on said holder for effecting fine focusing adjusting movements of said upright frame on the base, means for securing said frame in positions of focused adjustment and whereby said holder when placed in the projecting machine will be prefocused, ready for projection, and means on the holder for effecting angular movements of the prefocused subject matter carried by the holder.

7. A prefocusing holder for cards, glass slides, transparencies and like subjects to be shown in a projection machine for a television camera, comprising a base for supporting the holder on the projection machine, an upstanding frame keyed on the base for longitudinal movement in respect to the optical axis for the subject matter being projected, means on said upright frame for removably supporting a card or other subject matter to be projected, means on said holder for effecting fine focusing adjusting movements of said upright frame on the base and means for securing said frame in positions of focused adjustment and whereby said holder when placed in the projecting machine will be prefocused, ready for projection, said base having a notch for engagement over a guide on the projecting machine and openings through which lift rods may be inserted and whereby a group of the prefocused holders may be lifted as a unit and placed in registered relation over a guide on the projecting machine.

8. A holder for the cards, transparencies and other subject matter used in a projection device for a television program and comprising a base, an upstanding frame on said base, a rotatable carrier on said frame mounted for rotary adjustments about a horizontal axis, frames for carrying cards of different sizes removably and interchangeably mounted on said rotatable carrier and an upright frame slidably adjustable vertically and horizontally on said upstanding frame and supporting said rotary carrier thereon and whereby subject matter of different sizes may be interchangeably mounted on and rotatably adjusted by the rotatable carrier and be bodily shifted one way and another by said slidable frame to produce various combinations of projection effects.

9. A holder for the cards, transparencies and other subject matter used in a projection device for a television program and comprising a base, an upstanding frame on said base, means for effecting longitudinal focusing adjustments of said upstanding frame on said base, a vertically and laterally adjustable slide frame slidingly mounted on the upstanding frame, means for effecting vertical and lateral adjustments of said slide frame, card carriers interchangeably supported on said slide frame, a ring carrier rotatably mounted on said slide frame and said card carrying frames being removably mounted on said ring carrier and whereby subject matter of different sizes may be interchangeably mounted on and rotatably adjusted by the rotatable carrier and be bodily shifted one way and another by said slidable frame to produce various combinations of projection effects.

10. A holder for the cards, transparencies and other subject matter used in a projection device for a television program and comprising a base, an upstanding frame on said base, a slide frame vertically and laterally adjustable on said upstanding frame, said slide frame having parallel racks, a rotatably adjustable shaft having pinions fixed thereon in engagement with said racks, knobs on said shaft in engagement with the sides of said racks, one of said knobs being fixed to the shaft to impart rotary movement to the shaft and pinions and the other knob being loose on the shaft and having screw engagement with said upstanding frame for effecting lateral shifting of the shaft and racks, and card carrying frames interchangeably supported on the slide frame and whereby subject matter of different sizes may be interchangeably mounted on and rotatably adjusted by the rotatable carried and be bodily shifted one way and another by said slidable frame to produce various combinations of projection effects.

References Cited in the file of this patent

UNITED STATES PATENTS

| | | |
|---|---|---|
| 912,299 | Folmer | Feb. 16, 1909 |
| 993,296 | Guerrant | May 23, 1911 |
| 1,148,554 | Vandenberg | Aug. 3, 1915 |
| 1,368,880 | Beltini | Feb. 15, 1921 |
| 1,407,906 | Wenderhold | Feb. 28, 1922 |
| 1,522,284 | Chamberlain | Jan. 6, 1925 |
| 1,738,943 | Brenkert et al. | Dec. 10, 1929 |
| 1,881,355 | Geyling et al. | Oct. 4, 1932 |
| 2,153,221 | Wittel | Apr. 4, 1939 |
| 2,162,908 | Bedford et al. | June 20, 1939 |
| 2,243,084 | Browne | May 27, 1941 |
| 2,289,843 | Koch et al. | July 14, 1942 |
| 2,420,198 | Rosenthal | May 6, 1947 |
| 2,590,130 | Schlesinger | Mar. 25, 1952 |